United States Patent
Hundscheidt et al.

(10) Patent No.: US 7,113,768 B2
(45) Date of Patent: Sep. 26, 2006

(54) CONTROLLING CHARGING FOR WIRELESS MESSAGE SERVICES

(75) Inventors: Frank Hundscheidt, Kerkrade (NL); Petri Maekiniemi, Wurselen (DE); Leena Mattila, Kaarina (FI); Jari Vuorio, Aachen (DE); Reijo Salminen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/488,513

(22) PCT Filed: Oct. 4, 2001

(86) PCT No.: PCT/EP01/11470

§ 371 (c)(1), (2), (4) Date: Mar. 11, 2005

(87) PCT Pub. No.: WO03/024135

PCT Pub. Date: Mar. 20, 2003

(65) Prior Publication Data

US 2005/0181759 A1    Aug. 18, 2005

(30) Foreign Application Priority Data

Sep. 6, 2001    (WO) ............... PCT/EP01/10289

(51) Int. Cl.
*H04L 12/58* (2006.01)
*H04M 1/725* (2006.01)
*H04M 11/00* (2006.01)
*H04Q 7/22* (2006.01)

(52) U.S. Cl. ............... 455/412.1; 455/406; 455/408; 455/466

(58) Field of Classification Search ........ 455/406–408, 455/466, 412.1, 412.2, 414.1
See application file for complete search history.

(56) References Cited

U.S. PATENT DOCUMENTS

| | | | | |
|---|---|---|---|---|
| 5,742,668 A | * | 4/1998 | Pepe et al. ............ | 455/415 |
| 6,230,019 B1 | * | 5/2001 | Lee ..................... | 455/466 |
| 2001/0029174 A1 | * | 10/2001 | Herajarvi et al. ....... | 455/406 |

* cited by examiner

*Primary Examiner*—Charles N Appiah
*Assistant Examiner*—Jaime Holliday
(74) *Attorney, Agent, or Firm*—Roger Burleigh

(57) ABSTRACT

The invention relates to a method in a wireless communications system (WCS) of controlling charging procedures for message services which enable transport of messages from a mobile station (MS) to a service center (SC), the method comprising transporting a message from the mobile station (MS) for example via a network node (MSC/VLR) to the service center (SC), temporarily storing the message at the service center (40), sending a first confirmation acknowledging receipt of the message at a service center (SC) to the mobile station (MS), and, if the mobile station (MS) acknowledges receipt of the first confirmation, routing the message from the service center (SC) to a recipient of the message and initiating a charging procedure (CU) for a message. The invention also relates to a network node (MSC/VLR) implementing this method and a wireless communications system (WSC) comprising such a network node (MSC/VLR).

21 Claims, 4 Drawing Sheets

CONTROLLING CHARGING FOR WIRELESS MESSAGE SERVICES

BACKGROUND OF THE INVENTION

1. Technical Field of the Invention

The invention relates to the field of charging for services in a wireless communications system and in particular to a method of controlling charging procedures for message services which enable transport of messages from a mobile station to a service center. The invention further relates to a network node which implements such a control method and a wireless communications system comprising such a network node.

2. Description of the Prior Art

Wireless communications systems (WCS) like the "Global System For Mobile communications" (GSM) not only provide speech services but also data services like "Short Messages Services" (SMS). SMS enables the transmission of alphanumerical short messages of up to 160 ASCII characters.

GSM distinguishes between the "Mobile Terminating Short Message Service" (SMS-MT), for the reception of short messages, and the "Mobile Originating Short Message Service" (SMS-MO), enabling a GSM user to send such a message for instance to another GSM user, a user of a different telecommunications system, or an electronic mailbox. For enabling "Point-to-Point Short Message Services" (SMS-PP), GSM is in contact with a "Short Message Service Center" (SM-SC or simply service center, SC). A single SC may be connected to several GSM networks. In each of these GSM networks, one or several functional entities are in charge of interfacing the SC. In GSM, two types of such entities are defined: The "SMS-Gateway Mobile Services Switching Center" (SMS-GMSC) for SMS-MT and the "SMS-Inter Working Mobile Services Switching Center" (SMS-IWMSC) for SMS-MO. Both entities are called SMS-Gateway for short.

The communication of a WCS in the form of a GSM network with a SC for the case of SMS-MO is depicted in FIG. 1. As can be seen from FIG. 1, the GSM network comprises a mobile station (MS) which communicates with a "Mobile services Switching Center" (MSC). A "Visitors Location Register" (VLR) may be linked to one or more MSCs and is in charge of temporarily storing subscription data for all GSM users currently situated in the service area of MSC/VLR. The main function of MSC/VLR is to coordinate the setting-up of a connection from MS to the GSM network. MSC/VLR communicates with a SMS-IWMSC which provides a fixed GSM gateway for interconnection, or "Inter Working" (IW), with SC.

Communication between the individual components depicted in FIG. 1 is performed by using stacks of individual communication protocols. In the GSM standard, the stack of protocols between SMS-Gateways and SC is left open. What is specified in the GMS standard is a set of communication protocols for conveying the short messages between MS and SMS-Gateway.

The transportation of short messages within the GMS network involves essentially two segments: The MS to MSC/VLR segment, and the segment between MSC/VLR and SMS-Gateway. The "Short Message Transport Protocol" (SM-TP) specified between MS and SC is an end-to-end protocol including some features of an application protocol. Between MS and SMS-Gateway, the latter being the point of interconnection of SC in GSM, the mobile application part (MAP) protocol MAP/H interconnects with the "Short Message Relay Protocol" (SM-RP), which itself relays on the "Short Message Control Protocol" (SM-CP) for transport between MS and MSC/VLR.

The general architecture of protocols for the transport of point-to-point short messages is specified in TS GSM 03.40, where an example of a protocol stack for the connection of an SC to an MSC/VLR can be found. TS GSM 04.11 specifies both the SM-RP and the SM-CP protocols, which are used to carry short messages between MS and MSC/VLR. The MAP/H protocol is specified in MAP, that is to say by TS GSM 09.02.

In the following, the steps when sending a SMS-MO will be explained in more detail with reference to FIG. 1.

In a first step, symbolized by arrow 1, MS sends a SMS to MSC/VLR (CP-DATA Direct Transfer Application Part (DTAP) message). In a second step, symbolized by arrow 2, MSC/VLR answers to MS and acknowledges receipt of SMS (CP-DATA-ACK DTAP message). In a third step, symbolized by arrow 3, SMS is routed from MSC/VLR via SMS-IWMSC, i.e. the SMS-Gateway, to SC of terminating MS (ForwardShortMessage/ForwardMOShortMessage MAP messages). In a fourth step, symbolized by arrow 4, MSC/VLR receives an acknowledgment from SC via SMS-IWMSC about the result (ForwardShortMessage/ForwardMOShortMessage result messages). For example, this acknowledgment may be a confirmation that SMS has actually been received by SC. In a fifth step, symbolized by arrow 5, MSC/VLR forwards the acknowledgment received from SC to MS (CP-DATA DATAP message). In a sixth step, symbolized by arrow 6, MS acknowledges receipt of the CP-DATA DTAP message symbolized by arrow 5 (CP-DATA-ACK DTAP message). Upon receipt of the CP-DATA-ACK DTAP message, MSC/VLR accesses a charging unit CU, as indicated by arrow 7, and initiates charging by writing to a call detail record. In step 8, symbolized by arrow 8, MSC/VLR clears the transaction (Clear Command DTAP message).

If MS is intentionally or unintentionally made not reachable between the fourth and the fifth step, SMS has been successfully sent to SC, which forwarded SMS for example to a terminating MS. However, charging is generally not initiated before originating MS is informed about the result, i.e. before MSC/VRL signals to MS that SMS was successfully sent to SC (arrow 5) and that this transaction will now be charged. In such a case, i.e. when MS cannot be informed about the successful sending of a SMS towards SC, many service providers will not charge the SMS at all to avoid possible overcharging. Consequently, an SMS can be sent free of charge by intentionally or unintentionally making the originating MS not reachable shortly after sending of an SMS.

There is, therefore, a need for a method of controlling charging procedures for message services which renders the charging more secure and more robust against fraud. There is also a need for a switching center which implements such a method and a wireless communications system comprising such a switching center.

SUMMARY OF THE INVENTION

The existing need is satisfied according to the invention by a method in a wireless communications system of controlling charging procedures for message services which enable transport of messages from a mobile station to a service center, the method comprising transporting a message from the mobile station, preferably via a network node like a switching center, to the service center, temporarily storing the message at the service center, sending a first confirmation acknowledging receipt of the message at the service center to the mobile station, and, if the mobile station acknowledges receipt of the first confirmation, routing the message from the service center to a recipient of the message, for example a terminating mobile station or an electronic mailbox (e-mail), and initiating a charging procedure for the message.

According to the invention, a message received by the service center is not automatically routed to its recipient but temporarily stored at the service center. The service center is subsequently informed or decides itself about the further handling of the temporarily stored message. This further handling depends on whether or not the mobile station can be informed about the successful sending of the message to the service center. Preferably, the message is only forwarded from the service center to a recipient, and the charging procedure for the message is only initiated, if the mobile station can be reached and acknowledges receipt of the first confirmation. Otherwise, i.e. if the mobile station does not acknowledge receipt of the first confirmation for example because it can not be reached, the message temporarily stored at the service center may be deleted. The charging procedure is thus rendered more robust since the message is only forwarded to the recipient if it is possible to charge for the delivered message or if it is ensured that with a high likelihood such a charging can be performed.

According to a preferred implementation of the invention, the message temporarily stored at the service center is routed to the recipient of the message after expiry of a first time interval only if the service center does not receive any instructions to contrary. For example, if the service center does receive within the first time interval a first type of instruction indicating that the mobile station has not acknowledged receipt of the first confirmation, the message may be deleted. Otherwise, the message may be forwarded to its recipient.

Preferably, deletion of the message temporarily stored at the service center occurs in the case the mobile station does not acknowledge for example to the network node receipt of the first confirmation during a second time interval. This second time interval, which is preferably shorter than the first time interval, may be measured by the network node. If the mobile station does not acknowledge receipt of the first confirmation during the second time interval, the network node may send the first type of instruction to the service center. As has been mentioned above, the first type of instruction indicates that the mobile station has not acknowledged receipt of the first confirmation. Upon receipt of the first instruction at the service center, the temporarily stored message may be deleted.

In the case the mobile station can be reached and the mobile station acknowledges receipt of the first confirmation from the service center, this acknowledgement can be performed by sending a second confirmation to the network node or directly to the service center. Upon receipt of the second confirmation, the network node may send a second type of instruction to the service center. This second type of instruction indicates that the mobile station has actually acknowledged receipt of the first confirmation relating to receipt of the message at the service center. Upon receipt of the second type of instruction, the service center may route the message to its recipient.

Based on receipt of the second confirmation originating from the mobile station or based on a control signal, the network node may also send a third type of instruction to the service center. The third type of instruction indicates whether or not the mobile station acknowledged receipt of the first confirmation. The control signal for initiating sending of the third type of instruction may, for example, be generated by a timing circuit if the network node cannot reach the mobile station during a predefined period of time. After this predefined period of time monitored by the timing circuit has lapsed, the network node can automatically instruct the service center to delete the message temporarily stored at the service center. In this case no charging for the message is initiated.

Upon receipt of an instruction from the network node, the service center may act in accordance with this instruction, for example by forwarding the message to its recipient or by deleting the message. After the service center has acted upon the instruction, the service center preferably sends a corresponding third confirmation to the network node or directly to the mobile station. According to a first variant of the invention, the third confirmation is sent only if the mobile station has actually acknowledged receipt of the first confirmation and if additionally the message has been forwarded by the service center to the recipient of the message. According to a second variant of the invention, the third confirmation indicates whether the service center has successfully forwarded the message to its recipient or whether the service center has deleted the message. In the case the mobile station has actually acknowledged receipt of the first confirmation and the third confirmation is received at the network node, the charging procedure may be initiated automatically.

The above communication between the network node and the service center, which preferably takes place via a gateway interfacing the network node and the service center, may be performed by means of one or more newly defined MAP messages. For example, a first newly defined MAP message can be defined for an instruction sent from the network node to at least one of the gateway and the service center and a second MAP message may be newly defined for the third confirmation sent from the service center to the network node.

According to a further aspect of the invention, the message is routed from the service center to the recipient of the message based on an evaluation of statistical data associated with the mobile station from which the message has been sent. For example, it may be evaluated by the service center or the network node if the mobile station from which the message has been sent has been involved in irregularities concerning charging for messages before. Based on such an evaluation the service center or the network node may assess the probability that charging for the current message will be possible. If the probability of fraud is low, the message will be routed to its recipient without waiting for any acknowledgement from the mobile station. Otherwise, i.e., if the probability of fraud is high because fraudulent events have occurred in the past, the message may be forwarded to its recipient only if the mobile station actually acknowledges receipt of the first confirmation.

The above method can be implemented both as a hardware solution and as a computer program product comprising program code portions for performing the individual steps of the method when the computer program product is run on a computer of the wireless communications system. The computer program product may be stored on a computer readable recording medium like a data carrier attached to or removable from the computer.

The hardware solution is constituted by a network node, e.g. a switching center, in a wireless communications system implementing message services which enable transport of messages from a mobile station to a service center, wherein the network node comprises a router for routing a message from the mobile station to the service center to be stored at the service center, and for routing a first confirmation acknowledging receipt of the message at the service center to a mobile station, and a controller for determining if the mobile station acknowledges receipt of the first confirmation, and for initiating a charging procedure for the message, if the mobile station acknowledges receipt of the first confirmation. Furthermore, the network node may comprise a first timer for measuring a first time interval, wherein, if the mobile station does not acknowledge receipt of the first confirmation during the first time interval, the controller instructs the service center to delete the message.

Besides such a network node, the wireless communications system may comprise a gateway, for example a SMS-IWMSC, which enables communication between the network node and the service center. However, the network node may itself function as such a gateway. The wireless communications system may also comprise a charging unit for performing a charging procedure for each message routed from the service center to the recipient of the message.

The service center can be part of the wireless communications system or separate therefrom. In other words, while the transmission of the message is relayed by the service center, the service center may or may not be part of the wireless communications system. The service center may be part of a larger communications network which also comprises the wireless communications system outlined above. Regardless of the actual arrangement of the service center, the service center may comprise a memory for temporarily storing a message originating from a mobile station.

Besides the service center, the communications network may further comprise a second timer, wherein, if the controller does not instruct the service center during a second time interval to delete the message, the message is automatically routed to its recipient. Preferably, the second time interval is longer than the first time interval.

According to a further aspect of the invention, the communications network comprises a statistics database containing statistical data associated with the mobile station from which the message has been sent. The service center or a further component of the communications network may then decide based on an evaluation of the statistical data whether or not to route the message to its recipient without waiting for the mobile station to acknowledge receipt of the first confirmation.

BRIEF DESCRIPTION OF THE DRAWINGS

Further advantages of the invention will become apparent upon reference to the following description of a preferred embodiment of the invention in the light of the accompanying drawings, in which.

DESCRIPTION OF PREFERRED EMBODIMENTS

The present invention can be practiced in any wireless communications system in which message services are implemented. The message services are not restricted to such message services which enable transport of a sequence of alphanumerical characters, but may also allow transport of messages comprising for example pictures. In the following description of preferred embodiments, the invention is exemplarily set forth with respect to a wireless communications system according to the GSM standard and the transport of short messages in accordance with SMS. The invention, however, can also be practiced for example in a wireless communications system according to the third generation partnership project (3GPP).

Figure 2:
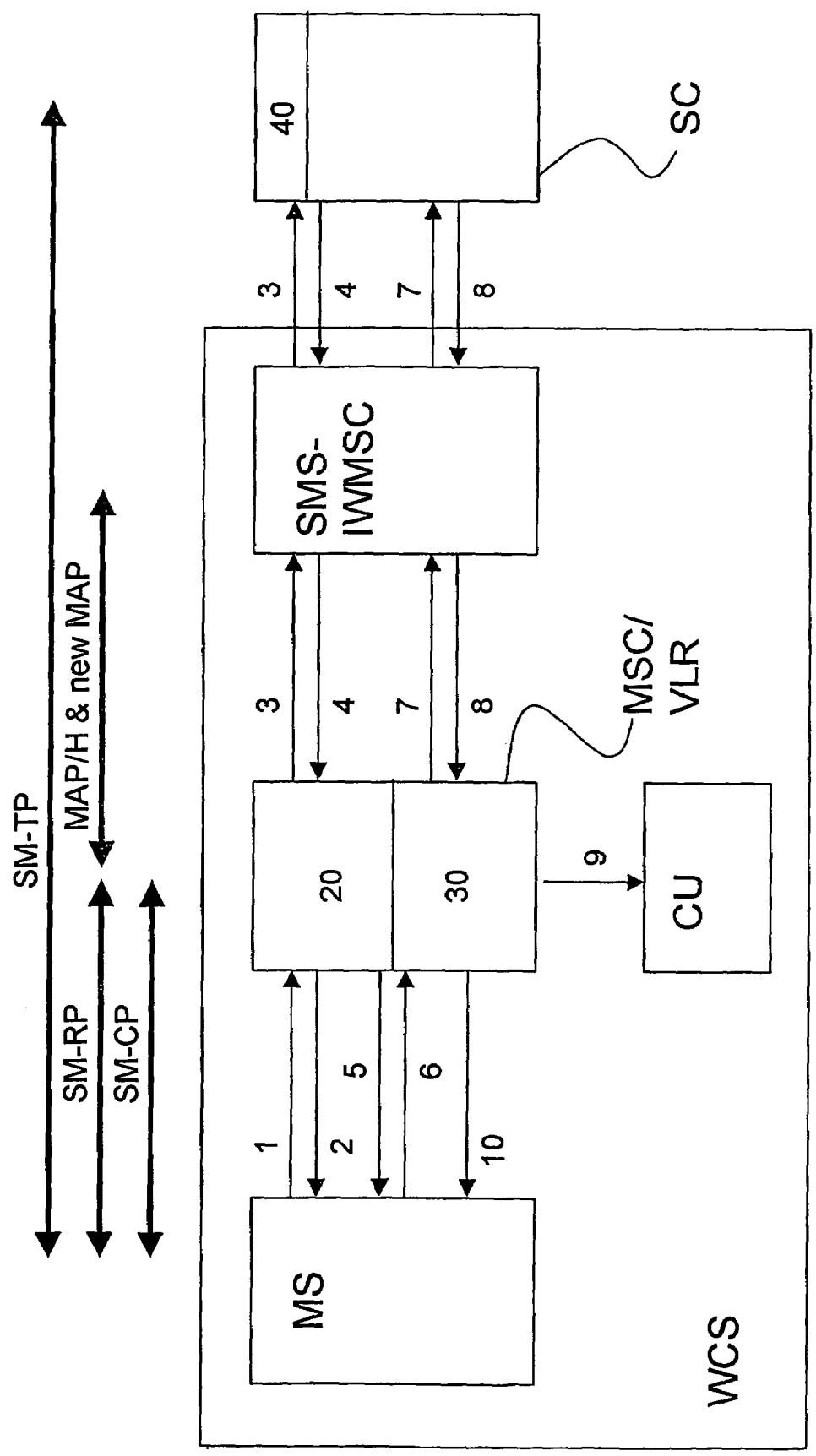
FIG. 2 shows a schematic diagram of the components enabling message services in a wireless communications system according to a first embodiment of the invention.

In FIG. 2, a communications network according to a first embodiment of the invention is depicted. The communications network comprises a WCS operating in accordance with the GSM standard and a short message SC communicating with the WCS. In the embodiment depicted in FIG. 2, the SC is outside the control of GSM network operators and connected to a SMS-IWMSC, which acts as a gateway between the GSM world and SC. The WCS of FIG. 2 further comprises a MS, a network node in the form of a MSC/VLR and a CU.

Figure 1:
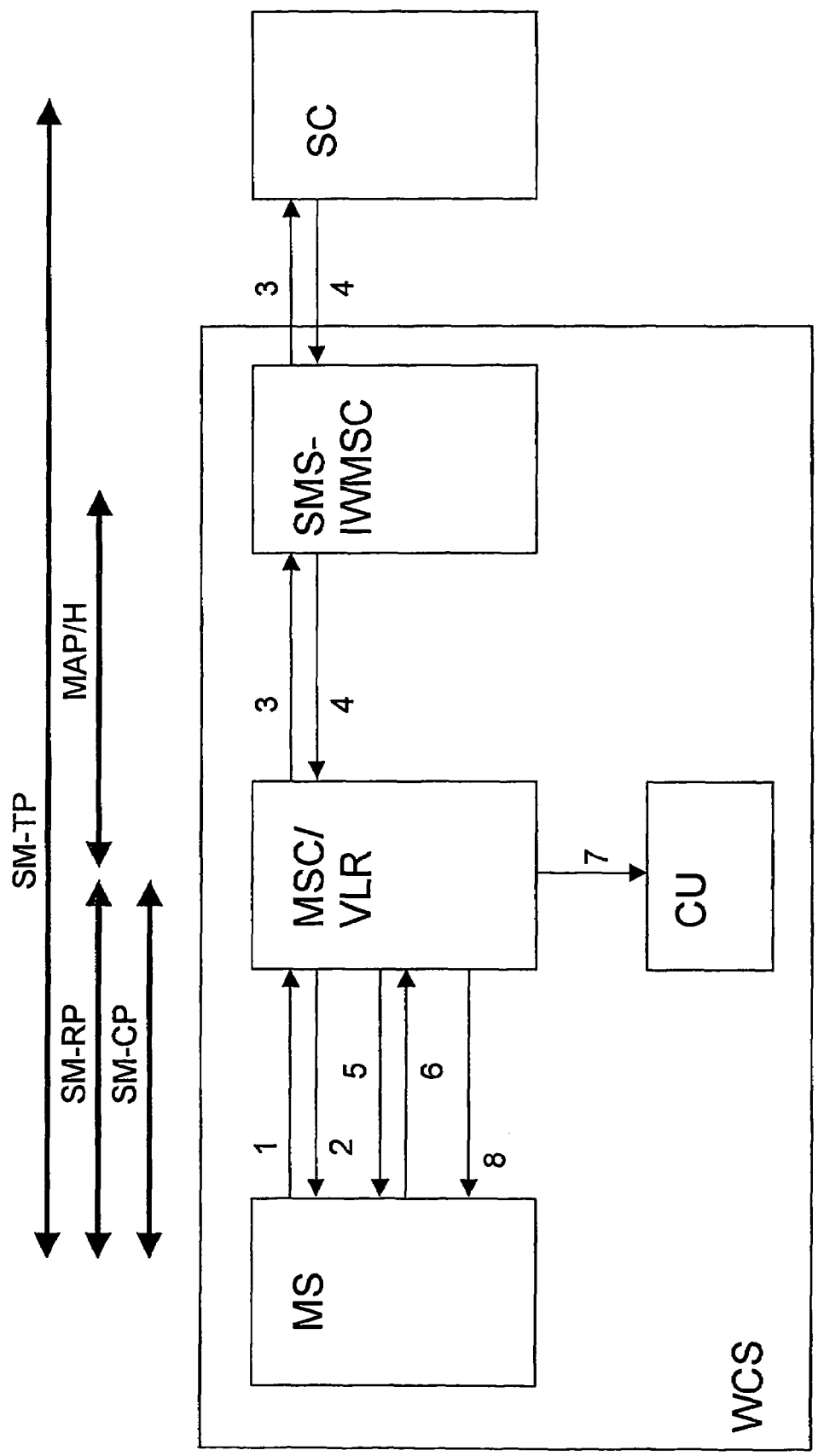
FIG. 1 shows a schematic diagram of the components enabling message services in a prior art wireless communications system.

The communications network shown in FIG. 2 thus comprises similar components like the communications network described above with reference to FIG. 1. However, MSC/VLR and SC of the communications network of FIG. 2 deviate from the construction of the corresponding components depicted FIG. 1. For example, MSC/VLR comprises a router 20 and a controller 30 and SC comprises a memory 40. The router 20 of MSC/VLR serves for forwarding a message from MS to SC to be stored in memory 40 of SC, and for routing a first confirmation, which acknowledges receipt of the message at SC, to MS. The controller 30 of MSC/VLR serves for determining if MS acknowledges receipt of the first confirmation, for instructing SC to either delete the message or to route the message from SC to a recipient of the message, and for initiating a charging procedure for the message, if MS acknowledges receipt of the first confirmation, by correspondingly controlling CU.

In the following, transport of a message in the form of an SMS within the communications network depicted in FIG. 2 will be described in more detail.

The first six steps, symbolized by arrows 1 to 6, are essentially identical with the corresponding steps explained above with reference to FIG. 1. Hence, a more detailed description of these steps will be omitted. It should be noted, however, that during steps 1 to 5 communication takes place via router 20 of MSC/VLR and that starting from step 6 communication takes place via controller 30 of MSC/VLR. Upon receipt of SMS at SC (arrow 3), SMS is temporarily stored in memory 40 of SC. After receipt of SMS, SC sends a corresponding first confirmation (arrow 4) via SMS-IWMSC back to router 20 of MSC/VLR. This first confirmation is forwarded to MS (arrow 5).

It will now be distinguished between two cases. According to the first case, router 20 reaches MS and informs MS by means of a CP-DATA DTAP message that SMS has successfully been sent to SC. In this case, MS will acknowledge receipt of the first confirmation by a CP-DATA-ACK DTAP message (second confirmation) to controller 30 of MSC/VLR (arrow 6). Upon receipt of the second confirmation, controller 30 of MSC/VLR instructs SC via SMS-IWMSC to forward the message stored in memory 40 to the recipient of the message. This is done by a first new MAP message which is symbolized by arrow 7. The first new MAP message informs SC that MS has responded and that SC can send the earlier received SMS further on. The first new MAP message thus indicates that MS has acknowledged receipt of the first confirmation.

According to the second case, router 20 of MSC/VLR is not able to reach MS after receipt of the MAP/H message symbolized by arrow 4. This also means that controller 30 of MSC/VLR will not receive the CP-DATA-ACK DTAP message symbolized by arrow 6 during a predetermined period of time after receipt of the MAP/H message symbolized by arrow 4. In such a case, controller 30 forwards a second new MAP message via SMS-IWMSC to SC as symbolized by arrow 7. This second new MAP message indicates that MS has not acknowledged receipt of the first confirmation. Upon receipt of the second new MAP message, SC deletes the message temporarily stored in memory 40.

Regardless of the type of new MAP message received by SC, SC sends a third confirmation (third new MAP message) via SMS-IWMSC to controller 30 of MSC/VLR. The third confirmation indicates that SC has acted upon the respective new MAP message, i.e. either forwarded or deleted the message stored in memory 40 of SC. This communication between SC and controller 30 of MSC/VLR is indicated by arrow 8.

Controller 30 of MSC/VLR initiates (symbolized by arrow 9) a charging procedure for the message only if an SMS was actually sent by SC and only after controller 30 of MSC/VLR has received the third confirmation from SC. As a last step, MSC/VLR clears the transaction with the Clear Command DTAP message as symbolized by arrow 10.

Figure 3A:
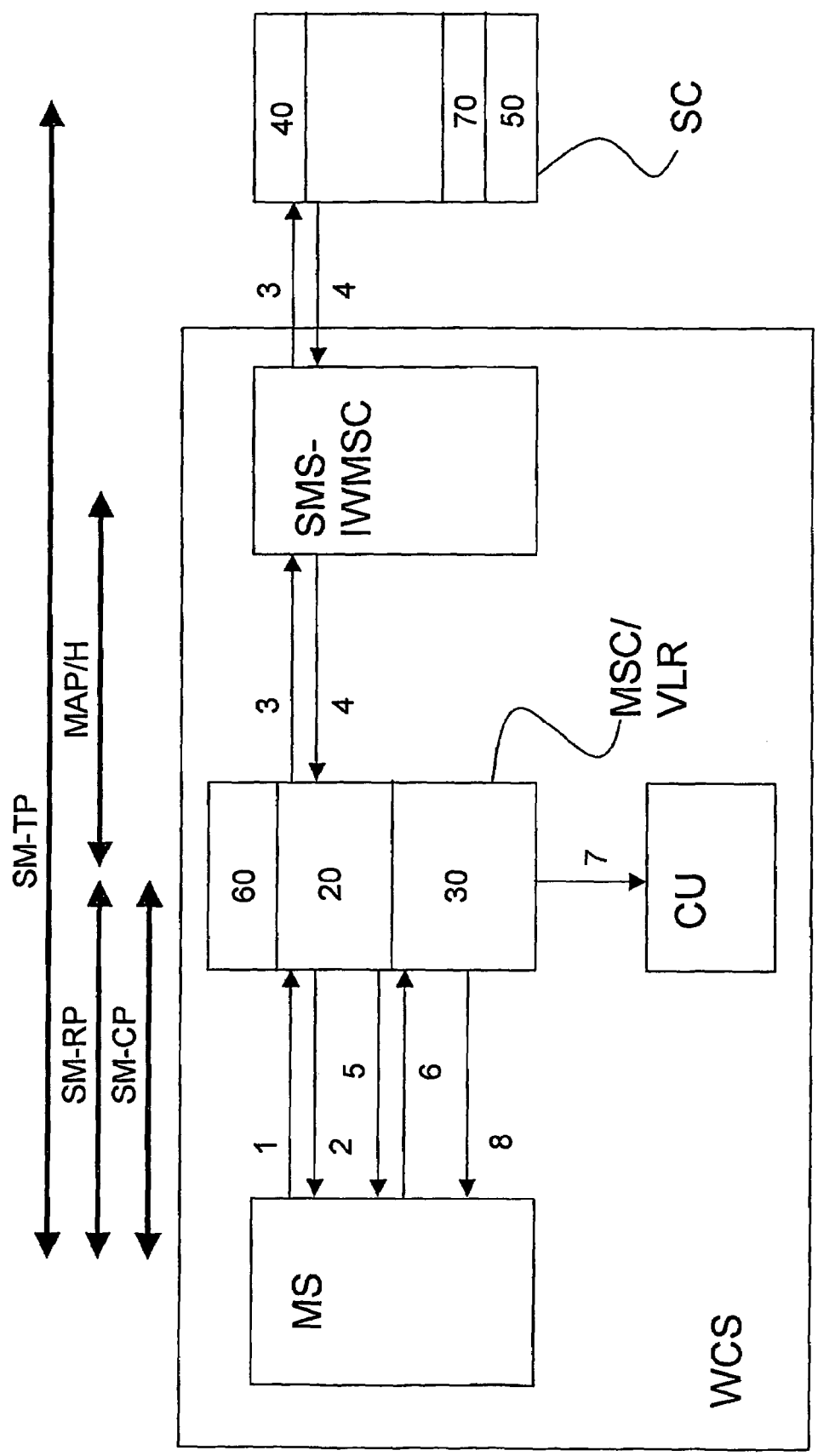
FIG. 3A, 3B show a schematic diagram of the components enabling message service in a wireless communications system according to a second embodiment of the invention.
Figure 3B:
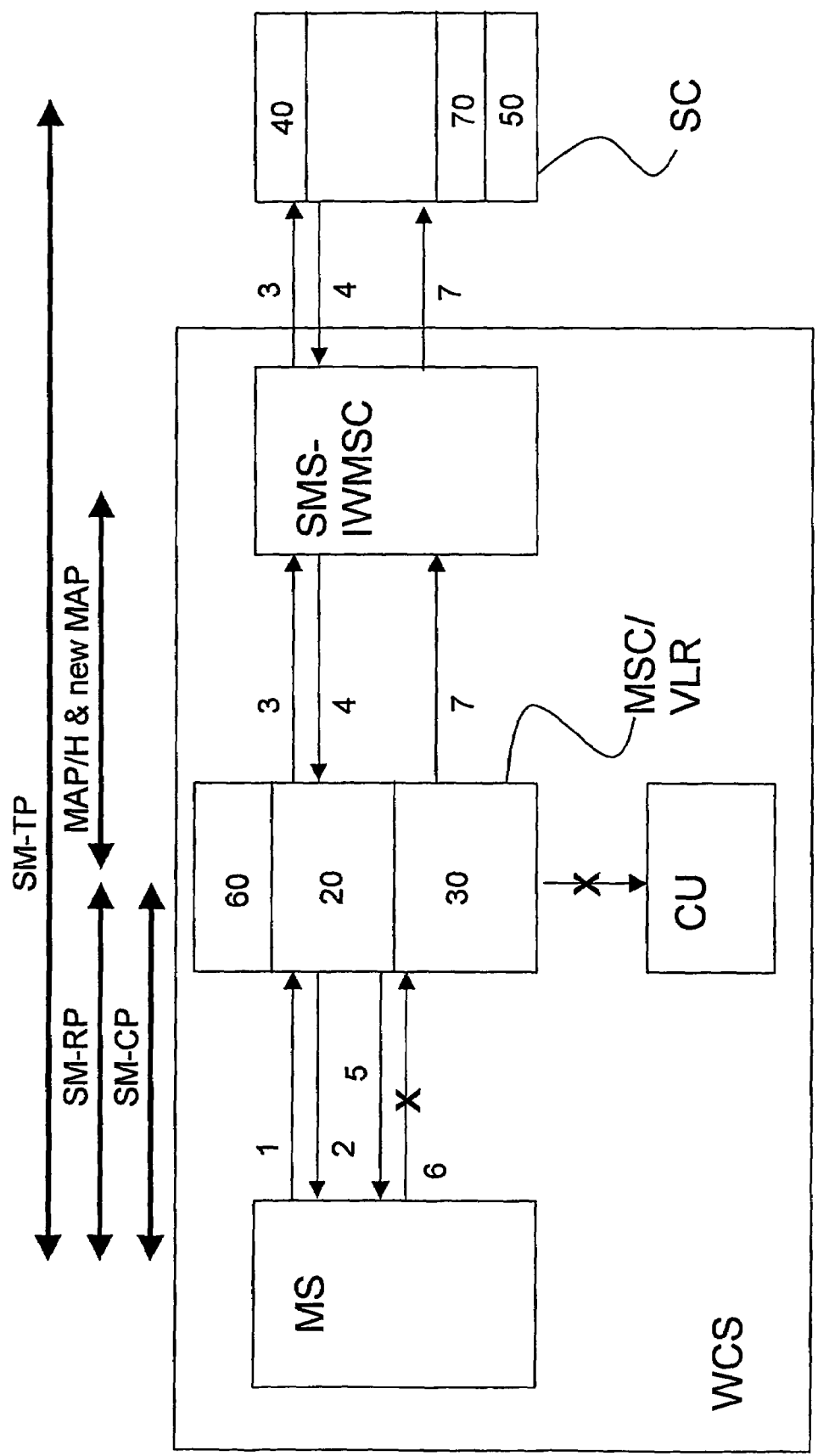

In FIGS. 3A, 3B, a communications network according to a second embodiment of the invention is depicted. The communications network shown in FIGS. 3A, 3B comprises similar components like the communications network described above with reference to FIG. 2. However, MSC/VLR and SC have extended functionalities. For example, MSC/VLR comprises a timer 60 for measuring a first predefined time interval and SC comprises a timer 50 for measuring a second predefined time interval which is longer than the first predefined time interval. Furthermore, SC comprises a statistics database 70.

In the following, transport of a message in the form of an SMS within the communications network depicted in FIG. 3A, 3B will be described in more detail. Since the first six steps, symbolized by arrows 1 to 6, are essentially identical with the corresponding steps explained above with reference to FIGS. 1 and 2, a detailed description of these steps will be omitted.

After MSC/VLR has forwarded a SMS from MS via SMS-IWMSC to SC, and after MSC/VLR has forwarded the acknowledgement received from SC to MS (arrow 5), timer 60 of MSC/VLR is started to run for the first predefined time interval. Like in the first embodiment depicted in FIG. 2, SC temporarily stores in memory 40 SMS received from MS via MSC/VLR and SMS-IWMSC (arrow 3). Upon receipt of SMS, timer 50 of SC is started to run for the second predefined time interval. SC then monitors during this second predefined time interval whether or not it receives an instruction from MSC/VLR to delete the message stored in memory 40. At this point two different scenarios may occur.

According to the first scenario depicted in FIG. 3A, MS acknowledges receipt of the first confirmation (arrow 6) during the first predefined time interval. Upon receipt of an acknowledgement (arrow 6) of MS, controller 30 of MSC/VLR will initiate charging procedures for SMS as is known in the art (arrows 7 and 8). In this case the controller 30 will not instruct SC while timer 50 is running to delete the message. Therefore, upon expiry of the second predefined time interval monitored by timer 50, SMS stored in memory 40 will automatically be forwarded to its recipient with just a few seconds additional delay corresponding to the second predefined time interval. Since the total delay of an SMS is already in the order of minutes or even hours, such an additional delay will be acceptable to subscribers.

According to the second scenario depicted in FIG. 3B, controller 30 of MSC/VLR does not receive an acknowledgement of MS regarding receipt of the first confirmation (arrow 5) at MS while timer 60 of MSC/VLR is running. This situation is symbolized by the crossed out arrow 6. Upon expiry of the first predefined time interval monitored by timer 80, controller 30 of MSC/VLR sends an instruction in the form of a newly defined MAP message (arrow 7) via SMS-IWMSC to SC. The instruction symbolized by arrow 7 indicates that MS has not acknowledged receipt of the first confirmation and instructs SC to delete SMS temporarily stored in memory 40 of SC. Since the time interval monitored by timer 60 of MSC/VLR is shorter than the time interval monitored by timer 50 of SC, it can be ensured that SC receives the instruction symbolized by arrow 7 prior to expiry of the time interval monitored by its timer 50. Consequently, SMS stored in memory 40 will be deleted prior to expiry of the time interval monitored by timer 50 of SC. Thus, routing of SMS stored in memory 40 can be prevented. According to the scenario depicted in FIG. 3B, no charging for the deleted SMS will be initiated.

It should be noted that the scenario depicted in FIG. 3B is not very likely to occur since in 95% of all cases MS will acknowledge receipt of the first confirmation indicated by arrow 5. Therefore, an additional signalling as indicated by arrow 7 is restricted to the few cases in which MS cannot be reached by MSC/VLR after sending of an SMS by MS. Consequently, the second embodiment of the invention depicted in FIGS. 3A, 3B renders charging operations for SMS more robust while keeping the requirements regarding additional signalling low.

The additional signalling required in accordance with the second embodiment of the invention can be further reduced by exploiting statistical data stored in statistics database 70 of SC. Statistics database 70 comprises statistical data associated with MS from which SMS has been sent. The statistical data are indicative of the fraud likelihood associated with the subscriber operating MS.

SC routes SMS to its recipient in dependence on an evaluation of the statistical data available for the MS from which SMS has been sent. In the case fraud likelihood is low, SC may decide to forward SMS immediately, for example without storing SMS in memory 40 of SC or without waiting for an expiry of the time interval monitored by timer 50 of SC. Otherwise, if the fraud likelihood for MS from which SMS has been received is comparatively high, the inventive steps discussed in context with FIG. 2 or FIGS. 3A, 3B may be performed. Apart from the decision whether or not to deliver SMS immediately after receipt at SC, the statistical data enable further decisions also. For example, an additional indicator may be added to the charging records of CU for each SMS which possibly results from a fraudulent operation.

It should be noted that originating MS can never be sure that SMS really reached its recipient. In other words, charging is always based on successful sending of SMS towards SC and the fact that originating MS has been successfully informed about this successful sending.

It should further be noted that charging could also be initiated prior to receipt of the third confirmation at controller 30 of MSC/VLR, for example between the fourth step indicated by arrow 4 and the fifth step indicated by arrow 5. This, however, has the disadvantage that MS does not get the result whether or not SC has actually received SMS from MSC/VLR. Moreover, such an earlier charging may be incorrect since a user of MS my try to send SMS a second time and would consequently be charged twice.

The invention claimed is:

1. A method in a wireless communications system (WCS) of controlling charging procedures for message services which enable transport of messages from a mobile station (MS) to a service center (SC), said method comprising the steps of:
    (a) transporting a message from the mobile station (MS) to the service center (SC);
    (b) temporarily storing the message at the service center (SC);
    (c) sending a first confirmation acknowledging receipt of the message at the service center (SC) to the mobile station (MS);
    (d) determining, by said service center (SC), if the mobile station (MS) acknowledges receipt of the first confirmation, and, if the mobile station (MS) acknowledges receipt of the first confirmation, routing the message from the service center (SC) to a recipient of the message and initiating a charging procedure for the message.

2. The method of claim 1, wherein the message is transported from the mobile station (MS) to the service center (SC) via a network node (MSC/VLR).

3. The method of claim 1, wherein if the service center (SC) does not receive any instructions to the contrary, the service center (SC) routes the message to the recipient of the message after expiry of a first time interval.

4. The method of claim 3, wherein the first time interval is measured at at least one of the service center (SC) and a network node (MSC/VLR).

5. The method of claim 1, wherein, if the mobile station (MS) does not acknowledge receipt of the first confirmation, the message temporarily stored at the service center (SC) is deleted.

6. The method of claim 5, wherein the message temporarily stored at the service center (SC) is automatically deleted if the mobile station (MS) does not acknowledge receipt of the first confirmation during a second time interval.

7. The method of claim 6, wherein the second time interval is shorter than the first time interval.

8. The method of claim 6, wherein the second time interval is measured at a network node (MSC/VLR).

9. The method of claim 8, wherein, if the mobile station (MS) does not acknowledge receipt of the first confirmation during the second time interval, the network node (MSC/VLR) sends an instruction to the service center (SC), the instruction indicating that the mobile station (MS) has not acknowledged receipt of the first confirmation.

10. The method of claim 9, wherein the service center (SC) deletes the temporarily stored message upon receipt of the instruction.

11. The method of claim 1, wherein step (d) comprises sending a second confirmation acknowledging receipt of the first confirmation at the mobile station (MS) to at least one of the network node (MSC/VLR) and the service center (SC).

12. The method of claim 11, wherein step (d) comprises sending an instruction from the network node(MSC/VLR) to the service center (SC) upon receipt of the second confirmation, the instruction indicating that the mobile station (MS) has acknowledged receipt of the first confirmation.

13. The method of claim 2, wherein step (d) comprises sending an instruction from the network node (MSC/VLR) to the service center (SC), the instruction indicating whether or not the mobile station (MS) has acknowledged receipt of the first confirmation.

14. The method of claim 9, further comprising sending a third confirmation from the service center (SC) to the network node (MSC/VLR), the third confirmation acknowledging that the service center (SC) has acted upon the instruction.

15. The method of claim 3, wherein, if the mobile station (MS) has acknowledged receipt of the first confirmation, the charging procedure is initiated upon receipt of the third confirmation at a network node (MSC/VLR) or upon expiry of the first time interval.

16. The method of claim 9, wherein the instruction is a MAP message.

17. The method of claim 1, wherein the message is routed from the service center (SC) to the recipient of the message in dependence on an evaluation of statistical data associated with the mobile station (MS) from which the message has been sent.

18. A network node (MSC/VLR) in a wireless communications system (WCS) implementing message services which enable transport of messages from a mobile station (MS) to a service center (SC), the network node (MSC/VLR) comprising:
    a router (20) for routing a message from the mobile station (MS) to the service center (SC) to be stored at the service center (SC), and for routing a first confirmation acknowledging receipt of the message at the service center (SC) to the mobile station (MS); and
    a controller (30) for determining if the mobile station (MS) acknowledges receipt of the first confirmation, and for initiating a charging procedure for the message, if the mobile station (MS) acknowledges receipt of the first confirmation.

19. The network node of claim 18, further comprising a first timer (60) for measuring a first time interval, wherein, if the mobile station has not acknowledged receipt of the first confirmation during the first time interval, the controller (30) instructs the service center (SC) to delete the message.

20. A wireless communications system implementing message services which enable transport of messages from a mobile station (MS) to a service center (SC), the wireless communications system (WCS) comprising:
    a network node (MSC/VLR) including a router (20) for routing a message from the mobile station (MS) to the service center (SC) to be stored at the service center (SC), and for routing a first confirmation acknowledging receipt of the message at the service center (SC) to the mobile station (MS), and a controller (30) for determining if the mobile station (MS) acknowledges receipt of the first confirmation, and for initiating a charging procedure for the message, if the mobile station (MS) acknowledges receipt of the first confirmation;

a gateway (SMS-IWMSC), the network node (MSC/VLR) communicating with the service center (SC) via the gateway (SMS-IWMSC).

21. The wireless communications system of claim 20, further comprising a charging unit (CU) for performing a charging procedure for each message routed from the service center (SC) to the recipient of the message.

* * * * *